(12) United States Patent
Taniguchi et al.

(10) Patent No.: US 9,437,873 B2
(45) Date of Patent: Sep. 6, 2016

(54) SPINEL-TYPE LITHIUM MANGANESE-BASED COMPOSITE OXIDE

(75) Inventors: Satoru Taniguchi, Takehara (JP); Shinya Kagei, Takehara (JP); Yoshimi Hata, Takehara (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 92 days.

(21) Appl. No.: 14/002,524

(22) PCT Filed: Feb. 29, 2012

(86) PCT No.: PCT/JP2012/055069
§ 371 (c)(1),
(2), (4) Date: Aug. 30, 2013

(87) PCT Pub. No.: WO2012/118117
PCT Pub. Date: Sep. 7, 2012

(65) Prior Publication Data
US 2013/0337330 A1     Dec. 19, 2013

(30) Foreign Application Priority Data

Mar. 2, 2011 (JP) ................................ 2011-044936
Sep. 16, 2011 (JP) ................................ 2011-203385

(51) Int. Cl.
*H01M 4/505* (2010.01)
*C01G 45/12* (2006.01)

(52) U.S. Cl.
CPC .......... *H01M 4/505* (2013.01); *C01G 45/1242* (2013.01); *C01G 45/12* (2013.01); *C01P 2002/32* (2013.01); *C01P 2002/52* (2013.01); *C01P 2002/76* (2013.01); *Y02E 60/122* (2013.01)

(58) Field of Classification Search
None
See application file for complete search history.

(56) References Cited

U.S. PATENT DOCUMENTS

| 7,988,880 B2 | 8/2011 | Kumada et al. |
| 2010/0243952 A1* | 9/2010 | Kumada et al. ........... 252/182.1 |

FOREIGN PATENT DOCUMENTS

| JP | 07022020 A | 1/1995 |
| JP | 2004253169 A | 9/2004 |
| JP | 2005150102 A | 6/2005 |
| JP | 2010033786 A | 2/2010 |
| JP | 2010073370 A | 4/2010 |
| JP | 2010097947 A | 4/2010 |
| JP | 2010219065 A | 9/2010 |
| WO | 2011002074 A1 | 1/2011 |

OTHER PUBLICATIONS

Kagei et al. (WO 2011/002074) (a raw machine translation) (Abstract, Detailed Description, Claims and Drawings).*

* cited by examiner

*Primary Examiner* — Miriam Stagg
*Assistant Examiner* — Carmen Lyles-Irving
(74) *Attorney, Agent, or Firm* — The Webb Law Firm

(57) ABSTRACT

Regarding spinel-type lithium manganese-based composite oxide (LMO) to be used as a positive electrode active substance material for lithium battery, a novel LMO is provided, which is capable of maintaining discharge capacity even if charging and discharging are repeated under high temperatures. An LMO in which the crystallite size is 250 nm to 350 nm, the strain is 0.085 or less and the specific surface area increase rate when placed in water at 25° and pH 7 and ultrasonically dispersed at 40 W ultrasonic intensity for 600 seconds is 10.0% or less, can prevent a decrease in the output that accompanies the repetition of charging and discharging while at a high temperature.

15 Claims, No Drawings

SPINEL-TYPE LITHIUM MANGANESE-BASED COMPOSITE OXIDE

CROSS-REFERENCE TO RELATED APPLICATIONS

This application is the United States national phase of International Application No PCT/JP2012/055069 filed Feb. 29, 2012, and claims priority to Japanese Patent Application Nos. 2011-044936 and 2011-203385, filed Mar. 2, 2011 and Sep. 16, 2011, respectively, the disclosures of which are hereby incorporated in their entirety by reference.

TECHNICAL FIELD

The present invention relates to a lithium manganese based composite oxide (also referred in the present invention to "spinel-type lithium manganese-based composite oxide" or "LMO") having a spinel structure (space group Fd-3m), which can be used as a positive electrode active material for a lithium battery, and which, in particular, can be used suitably as a positive electrode active material of a large battery that equips an electric vehicle (EV: Electric Vehicle), a hybrid electric vehicle (HEV: Hybrid Electric Vehicle) or the like.

TECHNICAL BACKGROUND

Lithium batteries, in particular lithium secondary batteries, having such characteristics as a large energy density and a long life, are used widely as power 3669344. DOC 1 sources for home appliances such as video cameras and portable electronic devices such as notebook personal computers and cellular phones; recently, applications into large batteries that equip an electric vehicle (EV), a hybrid electric vehicle (HEV) and the like, are anticipated.

A lithium secondary battery is a secondary battery having a structure in which, during charging, lithium dissolves out from the positive electrode as an ion and moves towards the negative electrode to be stored and conversely, during discharging, the lithium ion returns from the negative electrode to the positive electrode, and it is known that the high energy density of the battery has its source mainly in the electric potential of the positive electrode material.

In addition to lithium transition metal oxides such as $LiCoO_2$, $LiNiO_2$ and $LiMnO_2$ having a layer structure, lithium manganese based composite oxides (LMO) such as $LiMnO_4$ and $LiNi_{0.5}Mn_{0.5}O_4$ are known as positive electrode active materials for lithium secondary batteries. Among these, owing to the low raw material costs, the absence of toxicity and safety, there is a focus on the lithium manganese based composite oxides (LMO) as a positive electrode active material for a large battery for an electric vehicle (EV), a hybrid electric vehicle (HEV) and the like. In addition, while excellent output characteristics are particularly demanded of a battery for an EV or HEV, on this point, compared to a lithium transition metal oxide such as $LiCoO_2$, which has a layer structure, a spinel-type lithium manganese-based composite oxide (LMO), which allows for insertion and desorption of Li ions three-dimensionally, has excellent output characteristics.

Regarding this species of spinel-type lithium manganese-based composite oxide (LMO), as a positive electrode active substance that, at the same time as being of low internal resistance, high output and high capacity, demonstrates excellent charge-discharge cycle characteristics even under high-temperature conditions, a positive electrode active substance is described in Patent Document 1, containing the lithium transition metal composite oxide represented by the general formula $Li_xM_yO_{Z-\delta}$ (where M represents a transition metal element Co or Ni, the relationships (X/Y)=0.98 to 1.02 and $(\delta/Z) \leq 0.03$ are fulfilled) and at the same time containing with respect to the transition metal element (M) constituting the lithium transition metal composite oxide, ((V+B)/M) =0.001 to 0.05 (molar ratio) of vanadium (V) and/or boron (B), whereof the primary particle size is 1 μm or greater, the crystallite size is 450 Å or greater and the lattice strain is 0.05% or less.

Described in Patent Document 2 is a positive electrode active substance for lithium secondary battery in which the ratio between the median diameters D50 of the positive electrode active substance determined by laser diffraction when the positive electrode active substance was dispersed into ethanol and ultrasonic was applied and not applied (the value of D50 (no ultrasonic)/D50 (with ultrasonic)) is 1 to 2.

As a novel positive electrode active substance material for lithium battery that allows the filling density (tap density) to be raised and simultaneously allows the output characteristics to be raised, a positive electrode active substance material for lithium battery is described in Patent Document 3, containing a spinel-type (space group Fd-3m) lithium transition metal oxide and a boron compound, the spinel-type lithium transition metal oxide being represented by general formula $Li_{1+x}M_{2-x}O_{4-\delta}$ (where M is a transition metal containing Mn, Al and Mg; x is 0.01 to 0.08; and $0 \leq \delta$), in which, as measured by the Rietveld method using the fundamental method, the inter-atomic distance Li—O is 1.971 Å to 2.006 Å and the crystallite size is 500 nm to 2,000 nm.

As a novel spinel-type lithium transition metal oxide (LMO) with excellent output characteristics that preferably may combine output characteristics and high-temperature cycle life span characteristics, an LMO is described in Patent Document 4, in which, as measured by the Rietveld method using the fundamental method, the inter-atomic distance Li—O is 1.971 Å to 2.006 Å and the crystallite size is 170 nm to 490 nm in a lithium transition metal oxide represented by general formula $Li_{1+x}M_{2-x}O_4$ (where M is a transition metal containing Mn, Al and Mg; and x is 0.01 to 0.08).

In addition, as a positive electrode active substance that enables fabrication of a lithium secondary battery in which high-temperature cycle characteristics are improved while the rate characteristics are also excellent, with satisfactory coating ability, a positive electrode active substance is described in Patent Document 5, containing crystal particles comprising lithium manganate of a spinel structure that contains lithium and manganese as constitutive elements, in which the average primary particle size is 1 μm or greater but less than 5 μm, the crystallite size in the powder x-ray diffraction pattern is 500 to 1500 nm, the value of lattice strain (η) is 0.05×10-3 to 0.9×10-3, and the ratio D50/DBET between the median diameter D50 (μm) thereof and DBET (μm) calculated from the BET specific surface area using general formula (1) is 1 to 4.

PRIOR ART REFERENCES

Patent Documents

[Patent Document 1] Japanese Patent Application Laid-open No. 2004-253169
[Patent Document 2] Japanese Patent Application Laid-open No. 2005-150102

[Patent Document 3] Japanese Patent Application Laid-open No. 2010-73370

[Patent Document 4] Japanese Patent Application Laid-open No. 2010-97947

[Patent Document 5] Japanese Patent Application Laid-open No. 2010-219065

Regarding lithium secondary batteries, the problem that output characteristics and discharge capacity gradually decrease concomitantly to the repetition of charging and discharging while at a high temperature has been pointed out.

Thus, the present invention provides a novel spinel-type lithium manganese-based composite oxide capable of maintaining the discharge capacity even if charging and discharging are repeated under high temperatures.

SUMMARY OF THE INVENTION

The present invention proposes a spinel-type (space group Fd-3m) lithium manganese based composite oxide, in which crystallite size is 250 nm to 350 nm, strain is 0.085 or less, and the specific surface area increase rate when placed in water at 25° and pH 7 and ultrasonically dispersed at 40 W ultrasonic intensity for 600 seconds is 10.0% or less.

As a cause for the output characteristics gradually decreasing concomitantly to the repetition of charging and discharging while at high temperature, the present inventors conjectured that positive electrode active substance particles would be aggregated with each other or there would be weak sintering, and even if they do not disintegrate during formation of the positive electrode, these aggregated portions and weak sintered portions would dissociate concomitantly to the repetition of charging and discharging while at high temperature, disintegrating the particles, whereby the conductive network between the positive electrode active substance particles become ruptured, causing the output characteristics to be decreased. Thus, the specific surface area increase rate when placed in water at 25° and pH 7 and ultrasonically dispersed at 40 W ultrasonic intensity for 600 seconds was adjusted to 10.0% or less; then, it was found that the decrease in output that accompanies the repetition of charging and discharging while at high temperature could be prevented.

In addition, a method is known, of enlarging the crystallite size, thereby diminishing the specific surface area in contact with the electrolytic solution so that metal elements are less likely to elute into the electrolytic solution. Enlarging the particle size elevates the ion conductivity, allowing the output to be raised. However, if merely firing under high temperature conditions in order to enlarge the crystallite size, although the crystallite size becomes larger, particles of spinel-type lithium manganese-based composite oxide (LMO) become firmly sintered resulting in the problem that when the desired particle size as a battery material has been reached, the battery characteristics decrease. In contrast to this, in the present invention, by further specifying the strain and the specific surface area increase rate simultaneously, along with the crystallite size, the decrease in discharge capacity due to repetition of charging and discharging while at high temperature has become suppressible.

As described above, by using this as a positive electrode active substance of a lithium ion battery, the spinel-type lithium manganese-based composite oxide of the present invention can maintain the discharge capacity even if charging and discharging are repeated under high temperature, thus, in addition to being usable as positive electrode active material of a battery for so-called consumer use, for instance, such as for notebook personal computers, cellular phones, cordless phone handsets, video movies, liquid crystal televisions, electric shavers, portable radios, headphone stereos, backup power sources, pacemakers and hearing aids, it can be used suitably as a positive electrode active material in particular of large batteries that equip EVs, HEVs and the like.

DESCRIPTION OF THE INVENTION

Embodiments of the present invention will be described hereinafter. However, the scope of the present invention is not limited to the embodiments described below.

<The Present LMO>

The spinel-type (space group Fd-3m) lithium manganese based composite oxide (hereafter also referred to "the present LMO") according to an embodiment of the present invention is a spinel-type (space group Fd-3m) lithium manganese based composite oxide, in which crystallite size is 250 nm to 350 nm, strain is 0.085 or less, and the specific surface area increase rate when placed in water at 25° and pH 7 and ultrasonically dispersed at 40 W ultrasonic intensity for 600 seconds is 10.0% or less.

(Crystallite Size)

In the present LMO, it is important that the crystallite size is 250 nm to 350 nm as measured by the Rietveld method using the fundamental method.

If the crystallite size is 250 nm to 350 nm, since the particle size is sufficiently large, the ion conductivity can be elevated, allowing the output to be raised. In addition, since the specific surface area in contact with the electrolytic solution is reduced, preventing the discharge capacity from gradually decreasing concomitantly to the repetition of charging and discharging while at high temperature is possible.

From such points of view, of the above 280 nm or greater is more desirable, of which 300 nm or greater is all the more desirable, for the crystallite size of the present LMO.

Here, "crystallite" means the maximum group deemed a single crystal, which can be determined by XRD measurements and performing a Rietveld analysis.

In order to adjust the crystallite size of the present LMO to the above-mentioned ranges, setting the firing temperature to 800 to 950° C. along with adjusting the shape of the firing container at firing, the proportion of the filling amount of the firing raw materials with respect to the opening surface area (open surface area) of the firing container, and the like, within the compositional range of the present LMO, is desirable.

(Specific Surface Area Increase Rate)

It is important for the present LMO that the specific surface area increase rate when placed in water at 25° C. and pH 7 and ultrasonically dispersed at 40 W ultrasonic intensity for 600 seconds is 10.0% or less.

If the specific surface area increase rate is 10.0% or less, the decrease in output characteristics due to repetition of charging and discharging can be suppressed, since particles no longer disintegrate from the positive electrode active substance particles being aggregated with each other or the sintering being weak and these aggregated portions and weak sintered portions dissociating concomitantly to the repetition of charging and discharging while at high temperature.

From such a point of view, 6.5% or less is more desirable, of which 4.5% or less is all the more desirable for the specific surface area increase rate of the present LMO.

In order to adjust the specific surface area increase rate of the present LMO to the above-mentioned ranges, disintegrating with a high-speed rotating grinder that generates an air stream (referred to as an "air stream-generating high-speed rotating grinder") after firing or after heat treatment and at the same time adjusting the rotation speed thereof, within the composition range of the present LMO, is desirable. Using such a grinder to grind at the desired rotation speed can disintegrate the portions where particles are aggregated with each other or where sintering is weak, allowing the specific surface area increase rate to be reduced.

Owing to similar reasons to above, it is desirable that the specific surface area after ultrasonic dispersion/specific surface area before ultrasonic dispersion is 1.00 to 1.13, of which 1.00 to 1.10, whereof 1.00 to 1.07, are more desirable, for the present LMO.

Regarding the measurement of the specific surface area (CS) increase rate of the present LMO, it can be obtained by using a sample circulator for laser diffraction particle size distribution meter, introducing the present LMO, that is to say, the lithium manganese based composite oxide powder into water, measuring the particle size distribution before and after ultrasonic dispersion using a laser diffraction particle size distribution meter, and, measuring the specific surface areas before and after ultrasonic dispersion from the obtained chart of volumetric standard particle size distribution to calculate the increase rate of the specific surface area.

In so doing, sometimes, depending on the storage duration, storage state, and the like, of the lithium manganese based composite oxide powder, the extent of aggregation varies, in which case, the rate of specific surface area (CS) increase fluctuates, resulting in large measurement errors. Thus, prior to the above ultrasonic dispersion, performing such pretreatment as the following to reduce the measurement errors of the specific surface area (CS) increase rate is desirable.

As a pretreatment to carry out prior to measuring the specific surface area (CS) increase rate, a method may be cited, whereby a lithium manganese based composite oxide powder is introduced into circulating water inside a sample circulator for laser diffraction particle size distribution meter, then, circulation is carried out for 2 minutes, whereafter measurements of the specific surface area (CS) increase rate is started.

(Strain)

It is important for the present LMO that the strain is 0.085 or less.

If the strain is small to this degree, the framework of the spinel-type lithium manganese-based composite oxide is sufficiently rigid, and when used as a positive electrode active substance of a lithium secondary battery, the output characteristics (rate characteristics), allows the high-temperature cycle life span characteristics and rapid-charge characteristics to be raised.

Thus, from such points of view, the strain of the present LMO is 0.080 or lower, of which 0.075 or less is more desirable.

In order to adjust the strain of the present LMO to the above-mentioned ranges, disintegrating with a high-speed rotating grinder that generates an air stream (referred to as an "air stream-generating high-speed rotating grinder") after firing or after heat treatment and at the same time adjusting the rotation speed thereof, within the composition range of the present LMO, is desirable. Using such a grinder to grind at the desired rotation speed can disintegrate the portions where particles are aggregated with each other or where sintering is weak, and moreover can control the strain from being introduced in the particle.

<Particle Size Distribution>

The average particle size (D50) of the present LMO determined by the laser diffraction/scattering particle size distribution measurement method is preferably 1 μm to 25 μm, in particular 5 μm or greater or 15 μm or less, of which in particular 10 μm or greater or 15 μm or less is desirable.

The 10% cumulative diameter (D10) of the present LMO determined by the laser diffraction/scattering particle size distribution measurement method is preferably 0.1 μm to 20 μm, in particular 1 μm or greater or 10 μm or less, of which in particular 2 μm or greater or 8 μm or less is desirable.

The 90% cumulative diameter (D90) of the present LMO determined by the laser diffraction/scattering particle size distribution measurement method is preferably 5 μm to 50 μm, in particular 10 μm or greater or 40 μm or less, of which in particular 15 μm or greater or 35 μm or less is desirable.

The maximum particle size (Dmax) of the present LMO determined by the laser diffraction/scattering particle size distribution measurement method is preferably 30 μm to 120 μm, in particular 30 μm or greater or 110 μm or less, of which in particular 30 μm or greater or 100 μm or less is desirable.

Further in addition, specific surface area (CS) of the present LMO determined by the laser diffraction/scattering particle size distribution measurement method is preferably 0.2 $m^2/cc$ to 5 $m^2/cc$, in particular 0.2 $m^2/cc$ or greater or 3 $m^2/cc$ or less, of which in particular 0.3 $m^2/cc$ or greater or 1.0 $m^2/cc$ or less is desirable. Adjustments to these ranges allow the high-temperature cycle characteristics to be satisfactory.

(Composition)

The present LMO can contain other metal elements, aside from Li and Mn.

Above all, it is desirable that the present LMO is a spinel-type (space group Fd-3m) lithium manganese based composite oxide represented by the general formula (1) $Li_{1+x}M_{2-x}O_4$ (where M includes Mn and includes any one species or two species or more among the group comprising Mg, Al, Ti, Ni, Co, Mo, W, Nb, Ta, Re and Fe; x is 0.01 to 0.08).

Of this, the lithium manganese based composite oxide represented by general formula (2) $Li(Li_xMg_yAl_zMn_{2-x-y-z})O_4$ (where $0.01 \leq x \leq 0.08$; $0.02 \leq y \leq 0.07$; $0.06 \leq z \leq 0.14$) is desirable.

In general formula (2), "x" is preferably 0.01 to 0.08, of which 0.01 to 0.05 and in particular 0.01 to 0.03 is more desirable.

in addition, "y" is preferably 0.02 to 0.07, of which 0.02 to 0.06 and in particular 0.02 to 0.04 is more desirable.

in addition, "z" is preferably 0.06 to 0.14, of which 0.07 to 0.13 and in particular 0.11 to 0.13 is more desirable.

Since those with a spinel structure in general contain oxygen deficiency, the atom ratio "4" of oxygen in the general formula (2) means to allow more or less non-stoichiometry (for instance 4-δ (0≤δ)) to be included, and a portion of the oxygen may be substituted by fluorine.

(Production Method)

Next, production methods for the present LMO will be described.

As a preferred production method for the present LMO, for instance, in addition to setting the firing temperature to 800 to 950° C. along with adjusting the shape of the firing container at firing, the proportion of the filling amount of the firing raw materials with respect to the opening surface area (open surface area) of the firing container, and the like, it is desirable after firing or after heat treatment to use an air stream-generating high-speed rotating grinder to disintegrate the fired mass at a preferred rotation speed, as described above.

However, the method is not limited to this production method.

As a production process for the present LMO, for instance, mixing lithium raw materials, manganese raw materials and other raw materials such as magnesium raw materials and aluminum raw materials, as necessary granulated drying, firing, as necessary classifying, further, as necessary heating, and then, disintegrating with an air stream-generating high-speed rotating grinder as described above and classifying, is adequate.

In so doing, a boron compound may be added to and mixed with the raw materials, and after wet grinding, granulated, dried and fired. When firing a spinel-type lithium manganese-based composite oxide, adding a boron compound and firing can promote sintering of micro-particles which are assembled crystal particles of spinel-type lithium manganese-based composite oxide (LMO), allowing compact aggregated micro-particles (secondary particles) to be formed, such that the filling density (tap density) can be increased. At the same time, since the generation and growth of crystals of spinel-type lithium manganese-based composite oxide (LMO) can be promoted, crystallite size of the spinel-type lithium manganese-based composite oxide can be enlarged, allowing the discharge capacity at high-load discharge (3 C) to be increased by decreasing the number of boundary surfaces in the primary particles.

Here, the lithium raw materials are not limited in particular and, for instance, lithium hydroxide (LiOH), lithium carbonate ($Li_2CO_3$), lithium nitrate ($LiNO_3$), $LiOH.H_2O$, lithium oxide ($Li_2O$), other fatty acid lithium and lithium halides, and the like, may be cited. Among these, hydroxide salt, carbonic acid salt and nitric acid salt of lithium are desirable.

As for magnesium raw materials, there is no particular limitation and, for instance, magnesium oxide (MgO), magnesium hydroxide ($Mg(OH)_2$), magnesium fluoride ($MgF_2$), magnesium nitrate ($Mg(NO_3)_2$) and the like, may be used, among which magnesium oxide is desirable.

As for manganese raw materials, using manganese metal and manganese dioxide purified by electrolysis, among which electrolytic manganese dioxide obtained by electrolysis, is desirable from the point of view of reactivity. Since an electrolytic manganese dioxide has adequate electro-chemical reactivity, it is thought to be desirable on the point that the effects of the present invention can be enjoyed all the more.

As for aluminum raw materials, there is no particular limitation. For instance, aluminum hydroxide ($Al(OH)_3$), aluminum fluoride ($AlF_3$) and the like may be used, among which aluminum hydroxide is desirable.

As the boron compound, it is desirable to use boric acid or lithium borate. As the lithium borate, for instance, those having various morphologies can be used, such as lithium metaborate ($LiBO_2$), lithium tetraborate ($Li_2B_4O_7$), lithium pentaborate ($LiB_5O_8$) and lithium perborate ($Li_2B_2O_5$), among which lithium tetraborate ($Li_2B_4O_7$) is desirable. Boron does not become a solid solute in the spinel, and provides the action of promoting sintering of the spinel in the firing process.

Adjusting the amount of boron compound added in a range that is greater than 0 percent in mass of the spinel-type lithium manganese-based composite oxide as boron (B) element but not more than 0.3 percent in mass, in particular 0.0001 to 0.2 percent in mass, of which 0.01 to 0.18 percent in mass, and from there 0.01 to 0.16 percent in mass, is desirable.

For mixing the raw materials, there is no particular limitation regarding the method as long as the mixing is homogeneous. For instance, it suffices to use a well known mixing machine such as a mixer, add each material simultaneously or in a suitable sequence and stir-mix wet or dry. In the case of wet mixing, it is desirable to add liquid media such as water and dispersant, wet-mix to obtain a slurry and grind the obtained slurry with a wet-grinding machine. In particular, it is desirable to grind to sub-micron order. After grinding to sub-micron order, performing granulation and firing can increase the homogeneity of each particle prior to firing reaction, allowing the reactivity to be increased.

While the raw materials mixed as described above may be fired as-is, they may be granulated to a given size and fired.

As long as the various raw materials that were ground in the previous step do not separate and are dispersed in the granulation particles, the granulation method may be wet or dry, extrusion granulation method, tumbling granulation method, fluidized bed granulation method, mixing granulation method, spray drying granulation method, compression molding granulation method, or flake granulation method using a roll or the like. However, if wet granulation is performed, drying thoroughly prior to firing is necessary. As far as drying methods, it suffices to dry by a well known method such as spray heat drying method, hot air drying method, vacuum drying method and freeze-drying method, among which spray heat drying method is desirable. It is desirable to perform spray heat drying method using a hot spray dryer (spray dryer). Granulating with a hot spray dryer (spray dryer) not only allows the particle size distribution to be sharper but also allows production to be carried out in such a manner that aggregated particles (secondary particles), which have aggregated spherically, are contained.

For firing, it is desirable to perform firing in a firing furnace, under air atmosphere, under oxygen gas atmosphere, under an atmosphere with adjusted oxygen partial pressure, or under carbon dioxide gas atmosphere, or under another atmosphere, so as to raise the temperature at a rate of rise in temperature of 50 to 200° C./hr and maintain a temperature of 800 to 950° C. (means the temperature when a thermocouple is brought into contact with the fired entity inside the firing furnace) for 0.5 to 30 hours. However, when firing along with a boron compound, firing is possible in a lower temperature region than the firing temperature described above.

There is no particular limitation on the type of firing furnace. For instance rotary kiln, stationary furnace and other firing furnaces may be used to perform firing.

In addition, it is desirable to adjust suitably the proportion between the atmosphere contact surface area and the lithium manganate raw materials filling volume at firing. For instance, adjusting the apparent density of the mixture raw materials, adjusting the filling amount of firing raw materials such as changing the filling height of the firing raw materials with respect to the open surface area of the firing container, changing the shape of the firing container and the like allow the proportion between the atmosphere contact surface area and the lithium manganate raw materials filling volume to be adjusted.

As described above, since adjusting the shape of the firing container, the proportion of the filling amount of firing raw materials with respect to the open surface area (free area for the atmosphere) of the firing container, and the like, can alter the crystallite size, it is desirable to adjust these so as to be within the given range of crystallite size.

After firing, as necessary, the powder may be brought into contact and water-washed with a polar solvent such as water, and then heated at 300 to 700° C. under air atmosphere and dried.

Contacting a polar solvent allows an impurity contained in a powder to be separated. For instance, it suffices to mix and stir the present LMO powder and a polar solvent into a slurry and separate the obtained slurry into solid and liquid by filtration or the like to eliminate the impurity. A slurry means a state in which the present LMO powder is dispersed in the polar solvent.

Regarding the liquid temperature during the water-wash, 5 to 70° C. is desirable, of which 10° C. or higher or 60° C. or lower is all the more desirable, of which in particular 20° C. or higher or 45° C. or lower is all the more desirable. The higher the liquid temperature at water-washing, the more cleaning effects can be obtained; however, it has been observed that the battery characteristics deteriorate if the liquid temperature exceeds 70° C. The reason can be assumed, that if the liquid temperature is too high, lithium in the lithium transition metal oxide becomes ion-exchanged with protons in the ion-exchanged water, whereby lithium is removed, which deteriorates high-temperature characteristics.

Regarding the amount of polar solvent brought into contact with the present LMO powder, adjustments so that the mass ratio of the present LMO powder with respect to polar solvent (also referred to as the "slurry concentration") is 10 to 70 wt % is desirable, of which adjustments so that the ratio is 20 wt % or greater or 60 wt % or less, and among these, 30 wt % or greater or 50 wt % or less, are all the more desirable. If the amount of polar solvent is too little, eluting impurities such as $SO_4$ becomes difficult; conversely, if it is too much, cleaning effects commensurate with such amounts cannot be obtained, which is diseconomy.

For drying after the water-washing, drying by heating to 300 to 700° C. under an atmosphere that contains oxygen is desirable.

In addition, as necessary, magnetic separation, that is to say, a treatment that impurities which are magnetically adhered to a magnet are removed from the present LMO powder, may be carried out. Performing magnetic separation can eliminate impurities that cause short circuit.

Such a magnetic separation may be carried out with any timing in the present production method. For instance, it is preferably carried out after the water-washing step or after the last disintegration or grinding. By carrying out the magnetic separation after the last disintegration or grinding, iron or the like that is mixed by the chipping of the disintegration machine or the grinder can also be eliminated ultimately.

As the magnetic separation method, either among a dry magnetic separation method, in which the present LMO powder in a dried state is brought into contact with a magnet, and a wet magnetic separation method, in which a slurry of the present LMO powder is brought into contact with a magnet, is adequate.

From the point of view of magnetic separation efficiency, the wet magnetic separation method is more desirable on the point that the present LMO powder can be brought into contact with the magnet in a more dispersed state, in other words, in a non-aggregated state.

When the magnetic separation is carried out after water-washing, selecting the wet magnetic separation method is desirable on the point that it can be combined with the water-washing step. Conversely, when carried out after the last disintegration or grinding, adopting the dry magnetic separation method is desirable on the point that there is no need to dry afterwards.

When the wet magnetic separation method is carried out in combination with the water-washing step, by mixing and stirring the present LMO powder and the polar solvent into a slurry in the water-washing step, introducing into a wet magnetic separator and magnetically separating the obtained slurry in the magnetic separation step and then filtering, the impurities separated in the water-washing step and the magnetic separation step can be separated and eliminated all at once from the present LMO powder.

The structure of the wet magnetic separator is arbitrary. For instance, a magnetic separator provided with a constitution in which a filter or fin-shaped magnet is disposed inside a pipe can be indicated as an example.

When mixing and stirring the present LMO powder and the polar solvent into a slurry in the water-washing step and introducing into a wet magnetic separator and magnetically separating the obtained slurry in the magnetic separation step, the supply speed of the slurry supplied to the magnetic separation is preferably 0.2 to 3.0 m/sec from the point of view of raising the magnetic separation efficiency, of which 0.3 m/sec or greater or 2.0 m/sec or less, and of which in particular 0.5 m/sec or greater or 1.5 m/sec or less, is desirable.

The magnetic force of the magnet used in the magnetic separation (magnetic force at the location that contacts the present LMO powder) is preferably 8,000 G to 17,000 G (gauss), in particular 10,000 G or greater or 17,000 G or less is more desirable, of which in particular 12,000 G or greater or 17,000 G or less is more desirable. If the magnetic force of the magnet is too weak, obtaining the magnetic separation effect becomes difficult. On the other hand, if the magnetic force of the magnet is too strong, requisite is also eliminated, decreasing the collect rate.

In addition, after firing, it is desirable to carry out heat treatment as necessary. However, a heat treatment does not always have to be carried out.

The heat treatment may be performed under air atmosphere or under an atmosphere with higher partial oxygen pressure than air at a low temperature not exceeding, for instance 400° C., and from the point of view of moisture elimination, heat treatment is preferably performed at low temperatures on the order of 200 to 300° C.

The heat treatment temperature means the product temperature of the object being treated as measured by bringing a thermocouple in contact with the object being treated inside the oven.

For disintegration after firing or after heat treatment, disintegrating using an air stream-generating high-speed rotating grinder, or the like, is desirable, as described above. If disintegration is by an air stream-generating high-speed rotating grinder, portions where particles are aggregated with each other or where sintering is weak can be disintegrated, and moreover, introduction of strains into particles can be prevented.

While the disintegration means is not intended to be limited to an air stream-generating high-speed rotating grinder, as an example, a pin mill, known as a disk-rotating grinder, being a disintegration machine of a method in which a spinning disk with affixed pins rotates to bring the interior to a negative pressure and aspirate powder from the supplied material feeding port, can thoroughly break-up aggregation and weakly sintered portions between particles and prevent introduction of strains into particles, since fine powders, having large specific surface areas, flow readily in the air stream and pass through the pin mill while coarse particles are disintegrated thoroughly by the pin mill.

The rotation speed of the pin mill is preferably 4,000 rpm or greater and in particular 5,000 to 8,000 rpm.

In addition, since classifying has the technical significances of adjusting the particle size distribution of the aggregated powder along with the elimination of foreign substances, classifying in such a way that the mean particle diameter (D50) is in the range of 1 μm to 75 μm is desirable.

(Characteristics and Application)

The present LMO can be used effectively as positive electrode active material for a lithium battery.

For instance, a positive electrode mixture can be prepared by mixing the present LMO, a conductor comprising carbon black or the like and a binder comprising Teflon (registered trade mark) binder or the like. Then, such a positive electrode mixture can be used for the positive electrode, a material capable of storing and releasing lithium, such as, for instance, lithium or carbon, can be used for the negative electrode, and a lithium salt such as lithium hexafluophosphate ($LiPF_6$) dissolved in a mixed solvent such as ethylenecarbonate-dimethylcarbonate can be used for the non-aqueous electrolyte to construct a lithium secondary battery. However, limitation to a battery with such a constitution is not meant.

(Explanation of Expressions)

In the present specification, when the expression "X to Y" (X and Y are any numbers) is used, unless explicitly mentioned otherwise, the meaning of "X or greater but Y or lower" is included and at the same time the meaning of "preferably greater than X" or "preferably less than Y" is included.

In addition, when the expression "X or greater" (X is any number) is used, unless explicitly mentioned otherwise, the meaning of "preferably greater than X" is included and when the expression "Y or lower" (Y is any number) is used, unless explicitly mentioned otherwise, the meaning of "preferably smaller than Y" is included.

EXAMPLE

In the following, the present invention will be described further based on examples and comparative examples; however, the present invention is not to be limited to the examples indicated below.

<Measurements of Crystallite Size and Strain>

An x-ray diffractometer (D8 ADVANCE, manufactured by Bruker AXS) using a Cu-Kα beam was used for the measurements of x-ray diffraction patterns. The Rietveld method using the fundamental method is a method whereby the structural parameters of a crystal are refined from the diffraction intensities obtained by powder x-ray diffraction or the like. It is a method in which a crystal structure model is hypothesized, and various parameters of this crystal structure are refined in such a way that the x-ray diffraction pattern derived by calculations from this structure matches as much as possible the actually measured x-ray diffraction pattern.

Peaks in the x-ray diffraction patterns obtained from the range of diffraction angle 2θ=10 to 120° were analyzed using an analysis software (product name: Topas Version 3) to determine the lattice constants, crystallite size and strain.

Note that, it was hypothesized that the crystal structure belonged to the cubic crystal from the space group Fd-3m (Origin Choice2), Li was present at the 8a site thereof, Mn, Mn substitution elements (for instance, among the group comprising Mg, Mn, Al, Ti, Ni, Co, Mo, W, Nb, Ta, Re and Fe, any one species, or two or more species) and a further extra Li fraction x were present at the 16d site, and that O occupied the 32e site, the parameter Beq. was fixed to 1, and with the fractional coordinates of oxygen serving as variables and watching for the indices representing the extent of the match between the observed intensities and the calculated intensities Rwp<10.0 and GOF<2.0, the calculation was performed repeatedly until they converged, as shown in the table. The crystallite size and strain were analyzed using the Gauss function.

For the samples (powders) obtained in the examples and comparative examples, the crystal structure was identified by the Rietveld method using the fundamental method by having Rwp<10.0 and GOF<2 and then the lattice constants, crystallite size and strain were measured.

The instrument specifications, conditions and the like that were used for other measurements and Rietveld method analyses were as follows:
Detector: PSD
Detector Type: VANTEC-1
High Voltage: 5585V
Discr. Lower Level: 0.35V
Discr. Window Width: 0.15V
Grid Lower Level: 0.075V
Grid Window Width: 0.524V
Flood Field Correction: Disabled
Primary radius: 250 mm
Secondary radius: 250 mm
Receiving slit width: 0.1436626 mm
Divergence angle: 0.3°
Filament Length: 12 mm
Sample Length: 25 mm
Receiving Slit Length: 12 mm
Primary Sollers: 2.623°
Secondary Sollers: 2.623°
Lorentzian,1/Cos: 0.004933548Th
<Particle Size Distribution>

The particle size distributions of the samples (powders) were measured as follows.

Using a sample circulator ("Microtrac ASVR" manufactured by Nikkiso Co. Ltd.) for laser diffraction particle size distribution meter, sample (powder) was introduced in water, while at a flow rate of 40 mL/sec, 40 watts ultrasonic was emitted for 6 minutes, then, the particle size distribution was measured using a laser diffraction particle size distribution meter "HRA (X100)" manufactured by Nikkiso Co. Ltd. to determine D50, D10, D90, Dmax and CS (specific surface area) from the obtained chart of volumetric standard particle size distribution.

Note that water passed through a 60 μm filter was used for the aqueous solvent when measuring, the solvent refractive index was 1.33, the particle transparency condition was reflective, the measurement range was 0.122 to 704.0 μm, the measurement time was 30 seconds and the mean value from two measurements was used as the measurement value.

<Specific Surface Area (CS) Increase Rate>

Using a sample circulator ("Microtrac ASVR" manufactured by Nikkiso Co. Ltd.) for laser diffraction particle size distribution meter, sample (powder) was introduced in water (25° C., pH 7), while at a flow rate of 40 mL/sec, particle size distribution before and after ultrasonic dispersion by emitting an ultrasonic of 40 W ultrasonic intensity for 600 seconds (10 minutes) was measured using a laser diffraction particle size distribution meter "HRA (X100)" manufactured by Nikkiso Co. Ltd., and, from the obtained chart of volumetric standard particle size distribution, specific surface areas before and after ultrasonic dispersion were measured to calculate the specific surface area increase rate.

Note that water passed through a 60 μm filter was used for the aqueous solvent when measuring, the solvent refractive index was 1.33, the particle transparency condition was reflective, the measurement range was 0.122 to 704.0 μm, the measurement time was 30 seconds and the mean value from two measurements was used as the measurement value.

<Battery Evaluation>

(Battery Fabrication)

Li battery evaluation was carried out by the following method.

A paste was prepared by weighing accurately 8.80 g of positive electrode active material, 0.60 g of acetylene black (manufactured by Denki Kagaku Kogyo) and 5.0 g of a solution of 12 percent in weight PVDF (manufactured by Kishida Kagaku) dissolved in NMP (N-methyl pyrrolidone), adding thereto 5 ml of NMP and mixing thoroughly. This paste was placed above an aluminum foil which serves as a collector, coated with an applicator adjusted to a gap of 250 μm and turned into a film, vacuum-dried overnight at 120° C., then, punched with 16 mm ø and compressed by pressing at 4 t/cm² to be turned into a positive electrode. Immediately prior to battery fabrication, the adsorbed moisture was eliminated by vacuum drying at 120° C. for 120 min or longer, and fitted into the battery. In addition, the mean value of the weights of the 16 mm ø aluminum foils was predetermined, the weight of the aluminum foil was subtracted from the weight of the positive electrode to determine the weight of the positive electrode mixture; in addition, the content in the positive electrode active material was determined from the mixing ratios of the positive electrode active material, acetylene black and PVDF.

The negative electrode was a 20 mm ø×1.0 mm thick metal Li, and these materials were used to fabricate a TOMCELL electrochemical evaluation cell.

Regarding a constitution of the electrochemistry cell, a positive electrode 3 comprising the positive electrode mixture was positioned at the inner center of a lower body 1 made of organic electrolytic solution-resistant stainless steel. A separator 4 made of microporous polypropylene resin impregnated with an electrolytic solution was placed on the top surface of this positive electrode 3, and the separator was secured with a PTFE spacer 5. In addition, on the top surface of the separator, a negative electrode 6 comprising metallic Li was placed at the bottom, a spacer 7 overlaid with a negative terminal was placed, and from above, this was covered with an upper body 2, which was fastened with screws to seal the battery.

The electrolytic solution was one in which EC and DMC mixed at 3:7 in volume served as a solvent, into which 1 moL/L LiPF$_6$ was dissolved as solute.

(Evaluation of High-Temperature Cycle Life Characteristics)

The electrochemical cell prepared as described above was used to test charging-discharging and determine the high-temperature cycle life characteristics by the methods described below.

A cell was placed in an environment tester which was set in such a way that the ambient temperature at which the battery is charged-discharged was at 45° C., the cell was prepared so it could be charged-discharged, left for four hours so that the cell temperature reaches the ambient temperature, then, two cycles of charge-discharge were performed at 0.1 C with the charge-discharge range of 3.0V to 4.3 V, then, charge-discharge cycle was performed 39 times at 1 C with a charge-discharge range of 3.0 V to 4.3 V, and for the 40th cycle, in order to verify the capacity, charge-discharge was performed at 0.1 C with a charge-discharge range of 3.0 V to 4.3 V.

The percentage (%) value determined by dividing the discharge capacity at the 40th cycle by the discharge capacity at the 2nd cycle was calculated as the high-temperature capacity retention rate (0.1 C). In addition, 0.1 C was changed to 1.0 C, and similar cycle conditions were performed to determine the high-temperature capacity retention rate (1.0 C). Both were reported in Table 1 as relative values when the value for Comparative Example 1 is 100.

Example 1

Mixed raw materials were obtained by mixing lithium carbonate of 20.16 g, electrolytic manganese dioxide (TG diminution amount during 200° C.-400° C. heating: 3.0%) of 84.46 g, magnesium oxide of 0.66 g and aluminum hydroxide of 4.76 g.

The interior of a firing container (crucible made of alumina, size=length*width*height=10*10*5 (cm)) was filled with the obtained mixed raw material in such a way that the ratio between the open surface area and the filling height (open surface area cm²/filling height cm) was 100. In so doing, the apparent density of the raw material was 1.1 g/cm³.

Then, using a stationary electric furnace, the temperature was raised at the rate of rise in temperature=150° C./hr from ordinary temperature to the set firing temperature, retained at the firing temperature (retention temperature) of 913° C. for 20 hours, thereafter, the temperature was decreased at the rate of decrease in temperature=20° C./hr from the retention temperature to 600° C., and thereafter cooling to ordinary temperature was let to take place spontaneously. Note that the temperature fluctuation during the retention time was controlled within the range of 903° C. to 923° C.

The fired mass obtained by firing in this way was placed in a mortar, disintegrated with a pestle and sieve-separated with 5 mm sieve openings, from which the under-sieve product was disintegrated (disintegration condition: 5,000 rpm rotation speed) with a commercial pin mill (manufactured by Makino Manufacturing Co. Ltd.), sorted with a sieve having 50 μm openings, and the powder under the sieve was recovered as a spinel-type lithium manganese-based composite oxide powder (sample).

Example 2

A spinel-type lithium manganese-based composite oxide powder (sample) was obtained similarly to Example 1 except that the rotation speed of the pin mill was changed to 7,000 rpm.

Example 3

Up to firing was performed similarly to Example 1, the fired mass obtained by firing in this way was placed in a mortar, disintegrated with a pestle and sieve-separated with 5 mm sieve openings, from which the under-sieve product was disintegrated (7,000 rpm disintegration condition) with a commercial pin mill (manufactured by Makino Manufacturing Co. Ltd.), sorted with a sieve having 50 μm openings, and the powder under the sieve was recovered as a spinel-type lithium manganese-based composite oxide powder.

Next, 35 g of the obtained spinel-type lithium manganese-based composite oxide powder and 1 L of ion-exchanged water (pH 5.8) were mixed and stirred for 10 minutes to be turned into a slurry of spinel-type lithium manganese-based composite oxide powder (35 mass % slurry concentration). The liquid temperature at this time was 25° C. This slurry was passed inside a wet magnetic separator (magnetic force of the magnet at the location in contact with the slurry: 17,000 G) at a rate of 1.0 m/sec and then filtered under reduced pressure.

Further, the filter-separated spinel-type lithium manganese-based composite oxide powder was heated in atmosphere to 350° C. (product temperature) and dried for 5 hours at 1.0 g/sec water vapor elimination rate, then classifying was carried out with a sorter to obtain a spinel-type lithium manganese-based composite oxide powder (sample) under 325 mesh.

Comparative Example 1

A spinel-type lithium manganese-based composite oxide powder (sample) was obtained similarly to Example 1 except that the rotation speed of the pin mill was changed to 11,000 rpm.

(25° C., pH 7), while at a flow rate of 90%, ultrasonic of 40 W ultrasonic intensity was emitted for 6 minutes, then, the particle size distribution was measured using a laser diffraction particle size distribution meter "MT3300EXII" manufactured by Nikkiso Co. Ltd. to determine D50, D10, D90, Dmax and CS (specific surface area) from the obtained chart of volumetric standard particle size distribution. It was verified that similar results to above could be also obtained in this case.

Note that water passed through a 60 μm filter was used for the aqueous solvent when measuring, the solvent refractive index was 1.33, the particle transparency condition was reflective, the measurement range was 0.122 to 704.0 μm, the measurement time was 30 seconds and the mean value from two measurements was used as the measurement value.

Regarding the specific surface area (CS) increase rate, using a sample circulator ("Microtrac SDC" manufactured by Nikkiso Co. Ltd.) for laser diffraction particle size distribution meter, sample (powder) was introduced in water (25° C., pH 7), while at a flow rate of 90%, particle size

TABLE 1

| | | | Example 1 | Example 2 | Example 3 | Comparative Example 1 |
|---|---|---|---|---|---|---|
| XRD | a-axis length | (Å) | 8.2133 | 8.2134 | 8.2020 | 8.2131 |
| | Crystallite size | (nm) | 311 | 313 | 299 | 236 |
| | Strain(Ĝ Strain) | | 0.0758 | 0.0793 | 0.0825 | 0.1214 |
| Particle size | D50 | (μm) | 13.16 | 12.56 | 13.11 | 11.07 |
| distribution | D10 | (μm) | 5.79 | 5.65 | 6.41 | 3.70 |
| (6 min | D90 | (μm) | 27.33 | 25.48 | 23.79 | 22.11 |
| ultrasonic) | Dmax | (μm) | 88.00 | 74.00 | 62.23 | 52.33 |
| | CS | (m2/cc) | 0.576 | 0.598 | 0.554 | 0.827 |
| CS (after 10 min ultrasonic dispersion)/CS (no ultrasonic dispersion) | | | 1.06 | 1.04 | 1.05 | 1.14 |
| CS increase rate [%] | | | 6.0% | 4.2% | 4.9% | 13.8% |
| High-temperature capacity retention rate ratio | | | 102 | 102 | 102 | 100 |

Discussion

It was found from these results that a decrease in the output, which accompanies the repetition of charging and discharging while at a high temperature, can be prevented if the crystallite size is 250 nm to 350 nm, the strain is 0.085 or less, and if furthermore the specific surface area increase rate is 10.0% or less.

While the Examples 1 to 3 are spinel-type lithium manganese-based composite oxides represented by the general formula $Li_{1+x}M_{2-x}O_4$ (where M represents Mn, Mg and Al; and x is 0.01 to 0.08), from the fact that similar effects were confirmed to be obtained also for samples in which the amount of Mg and Al were modified, obtaining similar effects to the above examples is thought to be possible even if the substitution element is changed. Thus, even if M in the equation includes Mn and is any one species or two species or more among the group comprising Mg, Al, Ti, Ni, Co, Mo, W, Nb, Ta, Re and Fe, obtaining similar effects is thought to be possible.

In addition, it was verified that similar results could be also obtained when, alternatively to the model of instrument used for the measurements of particle size distribution and specific surface area (CS) increase rate, the following model was used.

Regarding measurements of particle size distribution, using a sample circulator ("Microtrac SDC" manufactured by Nikkiso Co. Ltd.) for laser diffraction particle size distribution meter, sample (powder) was introduced in water distribution before and after ultrasonic dispersion by emitting an ultrasonic of 40 W ultrasonic intensity for 600 seconds (10 minutes) was measured using a laser diffraction particle size distribution meter "MT3300EXII" manufactured by Nikkiso Co. Ltd., and, from the chart of volumetric standard particle size distribution obtained by HRA mode analysis, specific surface areas before and after ultrasonic dispersion were measured to calculate the specific surface area increase rate. It was verified that similar results to above could be also obtained in this case.

Note that water passed through a 60 μm filter was used for the aqueous solvent when measuring, the solvent refractive index was 1.33, the particle transparency condition was reflective, the measurement range was 0.122 to 704.0 μm, the measurement time was 30 seconds and the mean value from two measurements was used as the measurement value.

The invention claimed is:

1. A spinel-type (space group Fd-3m) lithium manganese based composite oxide, wherein
    crystallite size is 250 nm to 350 nm, strain is 0.085 or less, and
    wherein a specific surface area increase rate when placed in water at 25° and pH 7 and ultrasonically dispersed at 40 W ultrasonic intensity for 600 seconds is 10.0% or less, and
    wherein an average particle size (D50) is 5 μm to 25 μm.

2. The spinel-type (space group Fd-3m) lithium manganese based composite oxide according to claim 1, wherein specific surface area after ultrasonic dispersion/specific surface area before ultrasonic dispersion is 1.00 to 1.07.

3. The spinel-type lithium manganese-based composite oxide according to claim 1, represented by the general formula $Li_{1+x}M_{2-x}O_4$ (where M includes Mn and includes any one species or two species or more among the group comprising Mg, Al, Ti, Ni, Co, Mo, W, Nb, Ta, Re and Fe; x is 0.01 to 0.08).

4. The spinel-type lithium manganese-based composite oxide according to claim 1, prepared using electrolytic manganese as manganese raw materials.

5. The spinel-type lithium manganese-based composite oxide according to claim 1, prepared using electrolytic manganese dioxide as manganese raw materials.

6. The spinel-type lithium manganese-based composite oxide according to claim 1, obtained by firing at 850° C. or higher.

7. The spinel-type lithium manganese-based composite oxide according to claim 2, represented by the general formula $Li_{1+x}M_{2-x}O_4$ (where M includes Mn and includes any one species or two species or more among the group comprising Mg, Al, Ti, Ni, Co, Mo, W, Nb, Ta, Re and Fe; x is 0.01 to 0.08).

8. The spinel-type lithium manganese-based composite oxide according to claim 2, prepared using electrolytic manganese as manganese raw materials.

9. The spinel-type lithium manganese-based composite oxide according to claim 3, prepared using electrolytic manganese as manganese raw materials.

10. The spinel-type lithium manganese-based composite oxide according to claim 2, prepared using electrolytic manganese dioxide as manganese raw materials.

11. The spinel-type lithium manganese-based composite oxide according to claim 3, prepared using electrolytic manganese dioxide as manganese raw materials.

12. The spinel-type lithium manganese-based composite oxide according to claim 2, obtained by firing at 850° C. or higher.

13. The spinel-type lithium manganese-based composite oxide according to claim 3, obtained by firing at 850° C. or higher.

14. The spinel-type lithium manganese-based composite oxide according to claim 4, obtained by firing at 850° C. or higher.

15. The spinel-type lithium manganese-based composite oxide according to claim 5, obtained by firing at 850° C. or higher.

* * * * *